US007181343B2

(12) United States Patent
Mukaiyama

(10) Patent No.: US 7,181,343 B2
(45) Date of Patent: Feb. 20, 2007

(54) COMMUNICATION APPARATUS

(75) Inventor: Yoshio Mukaiyama, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/726,491

(22) Filed: Dec. 4, 2003

(65) Prior Publication Data

US 2004/0138809 A1 Jul. 15, 2004

(30) Foreign Application Priority Data

Dec. 4, 2002 (JP) ............................ 2002-352822

(51) Int. Cl.
*G01C 21/00* (2006.01)

(52) U.S. Cl. ...................................................... 701/200

(58) Field of Classification Search .................... 701/1, 701/2, 117–119, 200, 207, 211, 213, 300–302; 340/425.5, 435–436, 471, 825.36, 992
See application file for complete search history.

(56) References Cited

U.S. PATENT DOCUMENTS 5,153,559 A 10/1992 Atsumi
5,424,726 A 6/1995 Beymer
6,317,682 B1 * 11/2001 Ogura et al. ................ 701/117
6,362,748 B1 3/2002 Huang
6,366,834 B1 4/2002 Hayes et al.
6,662,108 B2 12/2003 Miller et al.
6,985,089 B2 * 1/2006 Liu et al. .................... 340/903
2002/0198632 A1 * 12/2002 Breed et al. ................... 701/1
2003/0125846 A1 * 7/2003 Yu et al. ......................... 701/1
2003/0169185 A1 * 9/2003 Taylor ........................ 340/945
2004/0061600 A1 * 4/2004 Wehner et al. .............. 340/435

FOREIGN PATENT DOCUMENTS

JP 61-239730 A 10/1986
JP 05-151500 A 6/1993
JP 05-266399 A 10/1993
JP 09-098125 A 4/1997
JP 10-206179 A 8/1998
JP 2000-102060 A 4/2000
JP A 2000-311294 11/2000
JP 2001-283381 A 10/2001
JP 2002-099989 A 4/2002
JP 2002-163753 A 6/2002
JP 2002-340583 A 11/2002

* cited by examiner

*Primary Examiner*—Thu V. Nguyen
(74) *Attorney, Agent, or Firm*—Kenyon & Kenyon LLP

(57) ABSTRACT

A vehicular communication apparatus in accordance with the invention, which is installed in a vehicle and designed to establish bidirectional communication with a foreign moving object, includes a collection device that collects a plurality of pieces of information obtained from the vehicle, a selection device that selects from the collected pieces of information those to be transmitted to the foreign moving object, and a transmission device that transmits only the selected pieces of information to the foreign moving object.

20 Claims, 9 Drawing Sheets

| LABEL | ITEM |
|---|---|
| a | ID CODE OF PARTNER TO COMMUNICATE WITH |
| b | EMERGENCY LEVEL |
| c | OPERATIONAL AMOUNT (ANGLE) OF STEERING WHEEL |
| d | OPERATIONAL AMOUNT (SWITCH) OF ACCELERATOR PEDAL |
| e | OPERATIONAL AMOUNT (SWITCH) OF BRAKE |
| f | VEHICLE SPEED |
| g | VEHICLE ACCELERATION/DECELERATION |
| h | OPERATIONAL STATE OF WINKER SWITCH |
| i | OPERATIONAL STATE OF WIPER SWITCH |
| j | LIGHTING-UP STATE OF HEADLIGHT |
| k | SETTING OF DESTINATION (INFORMATION FOR NAVIGATION) |
| l | SETTING OF ROUTE TO BE FOLLOWED (INFORMATION FOR NAVIGATION) |
| m | SETTING STATE OF CRUISE (AUTOMATIC DRIVING OR THE LIKE) |
| n | SITUATION CONCERNING DETECTION OF OBSTACLE IN FRONT |
| o | SITUATION CONCERNING DETECTION OF VEHICLE RUNNING BEHIND OR ALONGSIDE |
| p | RETRANSMISSION REQUEST FLAG & INFORMATION |
| q | CONVEYANCE OF POSSIBILITY OF RESPONDING (TO REQUEST MADE BY VEHICLE TO COMMUNICATE WITH) |
| r | REQUEST FOR DECELERATION (TO PARTNER TO COMMUNICATE WITH) |
| s | REQUEST FOR STOPPAGE (TO PARTNER TO COMMUNICATE WITH) |
| t | REQUEST FOR CHANGE OF LANES (TO PARTNER TO COMMUNICATE WITH) |
| u | (CONVEYANCE OF) DECELERATION OF OWN VEHICLE (TO PARTNER) |
| v | (CONVEYANCE OF) STOPPAGE OF OWN VEHICLE (TO PARTNER) |
| w | (CONVEYANCE OF) CHANGE OF LANES OF OWN VEHICLE (TO PARTNER) |
| x | INSTRUCTION ON DECELERATION. STOPPAGE, AND POINT FOR CHANGE OF LANES |
| y | DECELERATION OF OWN VEHICLE, STOPPAGE OF OWN VEHICLE, AND POINT WHERE OWN VEHICLE CHNAGES LANES |
| z | EXPECTED TIME FOR COMPLETION OF "x" AND "y" |

| | |
|---|---|
| 1 | ID CODE (IP ADDRESS OR THE LIKE) |
| 2 | POSITIONAL INFORMATION |
| 3 | VEHICLE TYPE CODE |

F I G. 4A

| LABEL | ITEM |
|---|---|
| a | ID CODE OF PARTNER TO COMMUNICATE WITH |
| b | EMERGENCY LEVEL |
| c | OPERATIONAL AMOUNT (ANGLE) OF STEERING WHEEL |
| d | OPERATIONAL AMOUNT (SWITCH) OF ACCELERATOR PEDAL |
| e | OPERATIONAL AMOUNT (SWITCH) OF BRAKE |
| f | VEHICLE SPEED |
| g | VEHICLE ACCELERATION/DECELERATION |
| h | OPERATIONAL STATE OF WINKER SWITCH |
| i | OPERATIONAL STATE OF WIPER SWITCH |
| j | LIGHTING-UP STATE OF HEADLIGHT |
| k | SETTING OF DESTINATION (INFORMATION FOR NAVIGATION) |
| l | SETTING OF ROUTE TO BE FOLLOWED (INFORMATION FOR NAVIGATION) |
| m | SETTING STATE OF CRUISE (AUTOMATIC DRIVING OR THE LIKE) |
| n | SITUATION CONCERNING DETECTION OF OBSTACLE IN FRONT |
| o | SITUATION CONCERNING DETECTION OF VEHICLE RUNNING BEHIND OR ALONGSIDE |
| p | RETRANSMISSION REQUEST FLAG & INFORMATION |
| q | CONVEYANCE OF POSSIBILITY OF RESPONDING (TO REQUEST MADE BY VEHICLE TO COMMUNICATE WITH) |
| r | REQUEST FOR DECELERATION (TO PARTNER TO COMMUNICATE WITH) |
| s | REQUEST FOR STOPPAGE (TO PARTNER TO COMMUNICATE WITH) |
| t | REQUEST FOR CHANGE OF LANES (TO PARTNER TO COMMUNICATE WITH) |
| u | (CONVEYANCE OF) DECELERATION OF OWN VEHICLE (TO PARTNER) |
| v | (CONVEYANCE OF) STOPPAGE OF OWN VEHICLE (TO PARTNER) |
| w | (CONVEYANCE OF) CHANGE OF LANES OF OWN VEHICLE (TO PARTNER) |
| x | INSTRUCTION ON DECELERATION. STOPPAGE, AND POINT FOR CHANGE OF LANES |
| y | DECELERATION OF OWN VEHICLE, STOPPAGE OF OWN VEHICLE, AND POINT WHERE OWN VEHICLE CHNAGES LANES |
| z | EXPECTED TIME FOR COMPLETION OF "x" AND "y" |

FIG. 4B

| LABEL | ITEM | |
|---|---|---|
| aa | CONVEYANCE OF (PROBABILITY OF) CRASH | |
| ab | CONVEYANCE OF (PROBABILITY OF) REAR-END COLLISION | |
| ac | CONVEYANCE OF (PROBABILITY OF) SCRAPE | |
| ad | CONVEYANCE OF MEETING POINT (LEFT AND RIGHT) | |
| ae | CONVEYANCE OF POSSIBILITY OF CROSSING (OR MISSING) EACH OTHER | |
| af | CONVEYANCE OF ACT OF OVERTAKING | |
| ag | CONVEYANCE OF PERMISSION TO OVERTAKE | |
| ah | EXPECTED TIME BEFORE HAVING SCRAPE WITH, MEETING OR CROSSING ANOTHER VEHICLE, ETC. | |
| ai | ITEM TO BE REQUESTED (OF VEHICLE AS PARTNER) FOR TRANSMISSION | |
| aj | REQUESTED ITEM 1 | HANDLED ON A CASE-BY-CASE BASIS |
| ak | REQUESTED ITEM 2 | |
| al | REQUESTED ITEM 3 | |
| am | REQUESTED ITEM 4 | |
| an | REQUESTED ITEM 5. . | (TO BE CONTINUED) |
| ao | CONVEYANCE OF PRESENCE OR ABSENCE OF INFORMATION IN INFRASTRUCTURE SYSTEM | |
| ap | MESSAGE 1 PLEASE GO FIRST | |
| aq | MESSAGE 2 WILL MAKE A STOP SHORTLY | |
| ar | MESSAGE 3 WILL MAKE A RIGHT OR LEFT TURN SHORTLY | |
| as | MESSAGE 4 WILL OVERTAKE | |
| at | MESSAGE 5 WILL REACH MEETING POINT | |
| au | MESSAGE 6 WIILL CHANGE LANES | |
| av | MESSAGE 7 WILL CROSS ANOTHER VEHICLE AT POINT xx | |
| aw | MESSAGE 8 ROGER | |
| ax | MESSAGE 9 NO GOOD OR PLEASE WAIT | |
| ay | MESSAGE 10 xx m AHEAD | |
| az | INFORMATION ON INFRASTRUCTURE SYSTEM OR THE LIKE | |

FIG. 5A

| EMERGENCY LEVEL | SITUATIONAL ITEM (SITUATION) | LABEL | | | | | | | | | | | | | | | | | | | | | | | | | |
|---|---|---|---|---|---|---|---|---|---|---|---|---|---|---|---|---|---|---|---|---|---|---|---|---|---|---|---|
| A (HIGH) | PURPOSE: PREVENTION OF ACCIDENTS | a | b | c | d | e | f | g | h | i | j | k | l | m | n | o | p | q | r | s | t | u | v | w | x | y | z |
| | (1) ACCIDENT OF HEAD-ON COLLISION | ◎ | A | ◎ | ◎ | ◎ | ◎ | ○ | ○ | △ | △ | △ | △ | △ | ○ | ○ | ○ | ◎ | ○ | ○ | ○ | ○ | ○ | ○ | ○ | ○ | ○ |
| | (2) ACCIDENT WHEN MAKING A RIGHT OR LEFT TURN (COLLISION BETWEEN VEHICLE MAKING A RIGHT TURN AND ANOTHER ONCOMING VEHICLE) | ◎ | A | ◎ | ◎ | ◎ | ◎ | ○ | ○ | △ | △ | △ | △ | △ | ○ | ○ | ○ | ◎ | ○ | ○ | ○ | ○ | ○ | ○ | ○ | ○ | ○ |
| | (3) ACCIDENT OF REAR-END COLLISION | ◎ | A | ◎ | ◎ | ◎ | ◎ | ○ | ○ | △ | ○ | △ | △ | △ | ○ | ○ | ○ | ◎ | ○ | ○ | ○ | ○ | ○ | ○ | ○ | ○ | ○ |
| | (4) ACCIDENT OF SUDDEN ENCOUNTER | ◎ | A | ◎ | ◎ | ◎ | ◎ | ○ | ○ | △ | ○ | △ | △ | △ | ○ | ○ | ○ | ◎ | ○ | ○ | ○ | ○ | ○ | ○ | ○ | ○ | ○ |
| | (5) ACCIDENT OF PEDESTRIAN (DASHING OUT) AGAINST BICYCLE | ◎ | A | ○ | ◎ | ◎ | ◎ | ○ | ○ | △ | ○ | △ | △ | △ | ○ | ○ | ○ | ◎ | ○ | ○ | | ○ | ○ | ○ | △ | ○ | ○ |
| | (6) ACCIDENT OF PEDESTRIAN (CROSSING THE STREET) AGAINST BICYCLE | ◎ | A | ○ | ◎ | ◎ | ◎ | ○ | ○ | △ | ○ | △ | △ | △ | ○ | ○ | ○ | ◎ | | ○ | | ○ | ○ | △ | △ | ○ | ○ |
| | (7) ACCIDENT OF SCRAPE BETWEEN PEDESTRIAN AND BICYCLE | ◎ | A | ○ | ◎ | ◎ | ◎ | ○ | ○ | △ | ○ | △ | △ | △ | ○ | ○ | ○ | ◎ | △ | ○ | | ○ | ○ | ○ | △ | ○ | ○ |

| EMERGENCY LEVEL | SITUATIONAL ITEM (SITUATION) | LABEL | | | | | | | | | | | | | | | | | | | | | | | | | |
|---|---|---|---|---|---|---|---|---|---|---|---|---|---|---|---|---|---|---|---|---|---|---|---|---|---|---|---|
| A (HIGH) | PURPOSE: PREVENTION OF ACCIDENTS | aa | ab | ac | ad | ae | af | ag | ah | ai | aj | ak | al | am | an | ao | ap | aq | ar | as | at | au | av | aw | ax | ay | az |
| | (1) ACCIDENT OF HEAD-ON COLLISION | ◎ | | | | | | | ◎ | ○ | ○ | ○ | ○ | ○ | ○ | ○ | | | | | | | | ○ | ○ | | ○ |
| | (2) ACCIDENT WHEN MAKING A RIGHT OR LEFT TURN (COLLISION BETWEEN VEHICLE MAKING A RIGHT TURN AND ANOTHER ONCOMING VEHICLE) | | ◎ | | | | | | ◎ | ○ | ○ | ○ | ○ | ○ | ○ | ○ | | | | | | | | ○ | ○ | | ○ |
| | (3) ACCIDENT OF REAR-END COLLISION | | ◎ | | | | | | ◎ | ○ | ○ | ○ | ○ | ○ | ○ | ○ | | | | | | | | ○ | ○ | | ○ |
| | (4) ACCIDENT OF SUDDEN ENCOUNTER | | ◎ | | | | | | ◎ | ○ | ○ | ○ | ○ | ○ | ○ | ○ | | | | | | | | ○ | ○ | | ○ |
| | (5) ACCIDENT OF PEDESTRIAN (DASHING OUT) AGAINST BICYCLE | | | ◎ | | | | | ◎ | △ | △ | △ | △ | △ | △ | △ | ○ | △ | △ | | | ○ | | ○ | △ | | ○ |
| | (6) ACCIDENT OF PEDESTRIAN (CROSSING THE STREET) AGAINST BICYCLE | | | ◎ | | | | | ◎ | △ | △ | △ | △ | △ | △ | △ | ○ | △ | △ | | | ○ | | ○ | △ | | ○ |
| | (7) ACCIDENT OF SCRAPE BETWEEN PEDESTRIAN AND BICYCLE | | | ◎ | | ○ | ○ | | ◎ | △ | △ | △ | △ | △ | △ | △ | ○ | △ | △ | | | ○ | | ○ | △ | | ○ |

FIG. 5B

| EMERGENCY LEVEL | SITUATIONAL ITEM (SITUATION) | LABEL | | | | | | | | | | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| B (INTERMEDIATE) | PURPOSE: ASSISTANCE IN DRIVING (PREVENTION AND SAFETY) | a | b | c | d | e | f | g | h | i | j | k | l | m | n | o | p | q | r | s | t | u | v | w | x | y | z | aa | ab | ac | ad | ae | af | ag | ah | ai | aj | ak | al | am | an | ao | ap | aq | ar | as | at | au | av | aw | ax | ay | az |
| | (8) ENCOUNTER WITH FORWARD ROAD SITUATION (PARKED VEHICLE OR ENGINEERING WORKS) | ◎ | B | | | | | | | | | | | | O | | O | | | | | | | | | | | | | | | | | | | | | | | | | | | | | | | | | | | | ◎ |
| | (9) ENCOUNTER WITH FORWARD ROAD SITUATION (TRAFFIC JAM, ACCIDENT, OR THE LIKE) | ◎ | B | | | | | | | | | | | | O | | O | | | | | | | | | | | | | | | | | | | | | | | | | | | | | | | | | | | | ◎ |
| | (10) RECEPTION OF INFORMATION ON AREA BEHIND OWN VEHICLE (ON APPROACHING VEHICLE OR THE LIKE) | ◎ | B | | | | | | | | | | | | O | | O | O | | | | | | | | | | | | | | | | O | O | | | | | | | | | | | | | | | | | | △ |
| | (11) CONVEYANCE OF PREDICTION TO VEHICLE SUSCEPTIBLE TO CRASH, REAR-END COLLISION, OR SCRAPE | ◎ | B | | | | | | | | | | | | | △ | O | O | | | | | | | | | O | O | O | O | O | O | O | O | | | | | | | | O | O | O | O | O | O | O | O | O | O | △ |
| | (12) RESPONSE TO REQUEST FOR PROVISION OF INFORMATION | ◎ | B | △ | △ | △ | △ | △ | △ | △ | △ | △ | △ | △ | △ | △ | O | O | | | | | | | | | | | | | | | | O | O | O | O | O | O | O | O | | | | | | | | | | | | △ |
| | (13) NOTIFICATION OF THE ACT OF OVERTAKING OR APPROACHING REAR END | ◎ | B | | | | O | O | | | | | | △ | | | O | O | | | | | | | | | | | | | | | | | O | O | O | O | O | O | O | | | | | | | | | | | | △ |
| | (14) CONVEYANCE OF OPTIMAL MEANS FOR CROSSING OR AVOIDING EACH OTHER | ◎ | B | | | | O | O | | | | | | △ | | | O | O | | | | | | | | | | | | | | | | | O | | | | | | | | | | | | | | | | | | O |
| | (15) CONVEYANCE OF ABNORMAL STATE OF FOREIGN VEHICLE | ◎ | B | | | | | | | | | | | | | | O | | | | | | | | | | | | | | | | | | | | | | | | | | | | | | | | | | | | △ |

FIG. 5C

| EMERGENCY LEVEL | SITUATIONAL ITEM (SITUATION) | LABEL | | | | | | | | | | | | | | | | | | | | | | | | | |
|---|---|---|---|---|---|---|---|---|---|---|---|---|---|---|---|---|---|---|---|---|---|---|---|---|---|---|---|
| C (LOW) | PURPOSE: INFORMATION INTERCHANGE, COMMUNICATION | a | b | c | d | e | f | g | h | i | j | k | l | m | n | o | p | q | r | s | t | u | v | w | x | y | z |
| | (16) REQUEST FOR INFORMATION GATHERING | ◎ | c | | | | | | | | | | | | | | ○ | | | | | | | | | | |
| | (17) NOTIFICATION OF BEHAVIOR OF OWN VEHICLE | ◎ | c | ○ | ○ | ○ | ○ | ○ | ○ | ○ | ○ | ○ | ○ | ○ | | | ○ | | | | | | | | | | |
| | (18) COMMUNICATION | ◎ | c | | | | | | | | | | | | | | ○ | | | | | | | | | | |

| EMERGENCY LEVEL | SITUATIONAL ITEM (SITUATION) | LABEL | | | | | | | | | | | | | | | | | | | | | | | | | |
|---|---|---|---|---|---|---|---|---|---|---|---|---|---|---|---|---|---|---|---|---|---|---|---|---|---|---|---|
| C (LOW) | PURPOSE: INFORMATION INTERCHANGE, COMMUNICATION | aa | ab | ac | ad | ae | af | ag | ah | ai | aj | ak | al | am | an | ao | ap | aq | ar | as | at | au | av | aw | ax | ay | az |
| | (16) REQUEST FOR INFORMATION GATHERING | | | | | | | | | ◎ | ◎ | ◎ | ◎ | ◎ | ◎ | ○ | | | | | | | | | | | ◎ |
| | (17) NOTIFICATION OF BEHAVIOR OF OWN VEHICLE | | | | ○ | ○ | ○ | ○ | ○ | ○ | ○ | ○ | ○ | ○ | ○ | ○ | ○ | ○ | ○ | ○ | ○ | ○ | ○ | ○ | ○ | ○ | △ |
| | (18) COMMUNICATION | | | | | | | | | ◎ | ○ | ○ | ○ | ○ | ○ | ○ | △ | △ | △ | △ | △ | △ | △ | △ | △ | △ | △ |

COMMUNICATION APPARATUS

INCORPORATION BY REFERENCE

The disclosure of Japanese Patent Application No. 2002-352882 filed on Dec. 4, 2002 including the specification, drawings, and abstract is incorporated herein by reference in its entirety.

BACKGROUND OF THE INVENTION

1. Field of the Invention

The invention relates to a communication apparatus for establishing bidirectional communication among a plurality of moving objects and, more particularly, to a vehicular communication apparatus suited to be installed in a vehicle.

2. Description of the Related Art

A vehicular control operation for safety driving is often performed on the basis of pieces of information that are collected by means of various sensors installed in a vehicle, a radar unit for detecting an obstacle around a vehicle, or the like. Also, pieces of information on traffic jam and the like are often provided to a running vehicle through communication between a road-side equipment disposed close to a road and an on-vehicle equipment installed in a vehicle (road-to-vehicle communication).

In recent years, communication among vehicles (hereinafter referred to as "vehicle-to-vehicle communication") has been proposed. Namely, the idea of performing a control operation for preventing accidents through cooperation of vehicles based on exchange of information or the idea of relaying information obtained by a certain vehicle from a road-side equipment to other vehicles so as to make it possible to indirectly acquire information provided by the road-side equipment without directly establishing road-to-vehicle communication has been discussed.

In vehicle-to-vehicle communication, each vehicle is provided with a radio transmitter-receiver that is designed to transmit a radio signal including information on an own vehicle and to receive a radio signal including information on a foreign vehicle. Vehicle-to-vehicle communication is established between one own vehicle and one or more foreign vehicles. Therefore, under a circumstance where a plurality of vehicles run while crowding around one another, the following two problems are caused. One of the problems is that each of the vehicles cannot efficiently acquire required information on any one of the other vehicles. The other problem is that an increase in the amount of information to be processed leads to an increase in the burden in performing processings.

In order to solve the problems mentioned above, it has been proposed to detect various situations in and around an own vehicle as situational data and to change a degree of frequence of transmission of an information signal in accordance with the situational data, as disclosed in Japanese Patent Application Laid-Open No. 2000-311294. This art is characterized by changing a degree of frequence of transmission of an information signal for the purpose of efficiently acquiring required information on one or more of many foreign vehicles that exist around an own vehicle.

In a vehicle-to-vehicle communication system of the related art, all pieces of possibly useful information are transmitted or received among vehicles participating in vehicle-to-vehicle communication. Hence, the amount of information included in each signal to be transmitted or received increases, so that the burden in processing the signal on the reception side increases. Under a circumstance where many vehicles run while crowding around one another, the following problem is caused. Namely, radio waves transmitted from a plurality of vehicles are scattered about in a frequency bandwidth assigned to vehicle-to-vehicle communication, so that the quality of communication deteriorates.

On the other hand, as disclosed in the aforementioned publication, the idea of changing a degree of frequence of transmission of a signal in vehicle-to-vehicle communication on the basis of various situations around a moving object such as a frequency utilization factor and a distance from an intersection serves to alleviate the burden in performing processings on the reception side and to make an improvement in frequency utilization factor. However, under an environment where a plurality of vehicles run while crowding around one another, the following problem is caused. Namely, the degree of frequence of transmission of a signal is so changed as to decrease, so that the usefulness of vehicle-to-vehicle communication is lessened. Especially under an environment where a plurality of vehicles run while crowding around one another, the degree of necessity for vehicle-to-vehicle communication is intrinsically high. Reduction of the degree of frequence of transmission of a signal under a situation as mentioned above cannot always be considered to be an advantageous measure.

SUMMARY OF THE INVENTION

It is an object of the invention to provide a vehicular communication apparatus and a communication apparatus which are capable of reducing the processing burden on the receiving side and enhancing usefulness of bidirectional communication.

In a first aspect of the invention, a vehicular communication apparatus comprises a vehicular collection device that collects a plurality of pieces of information on a vehicle obtained therefrom, a vehicular selection device that selects pieces of information to be transmitted to a foreign moving object from the collected pieces of information on the vehicle, and a vehicular transmission device that transmits only the selected pieces of information to the foreign moving object.

According to the aforementioned first aspect, the vehicular communication apparatus has the vehicular collection device that collects a plurality of pieces of information that can be useful to the foreign moving object. These pieces of information relate to the vehicle and are obtained, for example, from various sensors and the like that are installed therein. The collected pieces of information are sometimes useful and sometimes not useful to both the foreign moving object and the vehicle. According to the invention, instead of transmitting all the collected pieces of information to the foreign moving object, those pieces of information to be transmitted to the foreign moving object are selected and transmitted thereto. Thus, the burden in performing processings on the side of the foreign moving object that receives information is alleviated, and only those pieces of information which are useful to both the foreign moving object and the vehicle (including pieces of information that become useful to both of them as a result of bidirectional communication with the foreign moving object) can be transmitted. Even under a circumstance where a plurality of moving objects crowd around one another, bidirectional communication is realized with high efficiency. It is not required that those selected from the collected pieces of information be always constant. Therefore, the range of information that can be received by the foreign moving object is not narrowed.

In the aforementioned aspect, it is preferable that the vehicular selection device select pieces of information to be transmitted in accordance with at least one of a type of the foreign moving object and a request made by the foreign moving object. In this construction, only those pieces of information which are more probably useful to both the foreign moving object and the vehicle can be transmitted.

In the aforementioned aspect, it is preferable that the vehicular selection device select pieces of information to be transmitted in accordance with at least one of a relationship between the vehicle and the foreign moving object and a circumstance in which the vehicle runs. In this construction, only those pieces of information which are more probably useful to both the foreign moving object and the vehicle can be transmitted. The relationship between the vehicle and the moving object may include a relationship regarding position, traveling direction, or traveling speed. The circumstance in which the vehicle runs may include a state of an operation performed by a driver of the vehicle (e.g., an operational amount of an accelerator pedal) or a running position of the vehicle (e.g., a lane in which the vehicle runs or a current position of the vehicle relative to an intersection or a meeting point).

In the aforementioned aspect, it is preferable that the vehicular communication apparatus further comprise a vehicular emergency level determination device that determines an emergency level of bidirectional communication with the foreign moving object on the basis of a relationship between the vehicle and the foreign moving object, and that the vehicular selection device add the determined emergency level to the pieces of information to be transmitted. In this construction, both the foreign moving object and the vehicle can recognize an emergency level of (a degree of necessity for) communication between them. As a result, even under a circumstance where a plurality of moving objects crowd around one another, pieces of information that are useful to both of them can be exchanged without reducing a degree of frequence of communication in specific moving objects requiring communication, and the usefulness of bidirectional communication can be enhanced.

In the aforementioned aspect, it is preferable that the emergency level be determined in accordance with a possibility that concerns a collision or a scrape between the vehicle and the foreign moving object and that is predicted on the basis of the relationship between the vehicle and the foreign moving object. In this construction, important bidirectional communication for preventing a collision or a scrape between moving objects can be established by priority, and the usefulness of bidirectional communication can further be enhanced. A possibility of a collision or a scrape between moving objects may be determined, for example, on the basis of a result detected by a sensor (e.g., a millimeter wave radar) installed in a vehicle, a camera, or the like. In the case of a high possibility of a collision or a scrape, the emergency level may be set high.

In the aforementioned aspect, it is preferable that the vehicular communication apparatus further comprise a vehicular communication frequence-degree change device that changes a degree of frequence of communication with the foreign moving object in accordance with the determined emergency level or a vehicular communication object determination device that determines a foreign moving object to establish communication with in accordance with the determined emergency level. In this construction, even under a circumstance where a plurality of moving objects crowd around one another, bidirectional communication between moving objects requiring bidirectional communication is reliably ensured, and the usefulness of bidirectional communication can be enhanced.

In the aforementioned aspect, it is preferable that the vehicular selection device selects pieces of information to be transmitted in accordance with an emergency level which is determined in accordance with a relationship between the vehicle and the foreign moving object and a circumstance in which the vehicle runs.

In a second aspect of the invention, a vehicular communication apparatus that is installed in a vehicle and that is designed to establish bidirectional communication with a foreign moving object comprises a vehicular transmission device that transmits a certain piece of information including an identification code allowing the foreign moving object to identify the vehicle, a vehicular reception device that receives the piece of information including the identification code from the foreign moving object, a vehicular detection device that detects establishment of bidirectional communication between the vehicle and the foreign moving object on the basis of a result of identification of the identification code, a vehicular collection device that collects a plurality of pieces of information on the vehicle obtained therefrom, and a vehicular selection device that selects pieces of information to be transmitted to the foreign moving object from the collected pieces of information on the vehicle. The vehicular transmission device transmits the pieces of information selected by the vehicular selection device to the foreign moving object if the vehicular detection device detects establishment of bidirectional communication.

According to the aforementioned second aspect, with a view to specifying a foreign moving object participating in bidirectional communication, the vehicular transmission device of the vehicular communication apparatus transmits a certain piece of information including an identification code that can be recognized by the foreign moving object. If the piece of information including the identification code is received from the foreign moving object that has received the aforementioned certain information, mutual recognition between both the parties is achieved, and bidirectional communication between the vehicle and the foreign moving object is established. If bidirectional communication is established and started, the vehicular transmission device of the vehicular communication apparatus selects pieces of information to be transmitted to the foreign moving object from the collected pieces of information on the vehicle, and transmits the selected pieces of information to the foreign moving object. In this manner, certain pieces of information that are small in quantity are transmitted before bidirectional communication is started, and pieces of information that are useful to both the foreign moving object and the vehicle are transmitted after bidirectional communication has been started. As a result, bidirectional communication is realized with high efficiency. Even under a circumstance where a plurality of moving objects crowd around one another, bidirectional communication can be started smoothly. Also, the burden in processing received pieces of information on the side of the foreign moving object after the start of bidirectional communication is alleviated, and the usefulness of bidirectional communication can be enhanced.

In a third aspect of the invention, a communication apparatus installed in a moving object and that is designed to establish bidirectional communication with the vehicular communication apparatus according to the first aspect of the invention, to which the emergency level determination device has been further provided, comprises a moving-object reception device, a moving-object emergency level evaluation device, and a moving-object processing change device. The moving-object reception device receives selected pieces of information transmitted from the vehicular transmission device of the vehicular communication apparatus. The moving-object emergency level evaluation device evaluates the emergency level included in the received pieces of information. The moving-object processing change device changes a method of processing the received pieces of information in accordance with the emergency level.

According to the aforementioned third aspect, the communication apparatus establishes bidirectional communication with the aforementioned vehicular communication apparatus in accordance with the invention. The communication apparatus is installed in a moving object (e.g., a person or a bicycle) such as a vehicle. The communication apparatus receives selected pieces of information from the aforementioned vehicular communication apparatus. The selected pieces of information include the emergency level determined on the side of the aforementioned vehicular communication apparatus. In accordance with an emergency level extracted from the selected pieces of information, the communication apparatus changes a method of processing the received pieces of information. Thus, the method of processing the received pieces of information is changed in consideration of an emergency level transmitted from the side of a partner to establish communication with (e.g., only specific ones of the received pieces of information are transferred to a predetermined system so as to accelerate conveyance of information in the case of a high emergency level), whereby the usefulness of bidirectional communication can be enhanced.

In the aforementioned aspect, it is appropriate that the communication apparatus further comprise a moving-object emergency level determination device that determines an emergency level of bidirectional communication with the vehicular communication apparatus on the basis of a relationship between the moving object and the vehicle, and that the moving-object processing change device change a method of processing the received pieces of information in accordance with the determined emergency level and the emergency level included in the received pieces of information. In this construction, an emergency level may be determined on the side of the communication apparatus as well. In this case, the method of processing the received pieces of information can be changed in consideration of emergency levels of both the parties involved in communication.

In the aforementioned aspect, it is appropriate that the communication apparatus further comprise a moving-object collection device that collects a plurality of pieces of information on the moving object obtained therefrom, a moving-object selection device that selects pieces of information to be transmitted to the vehicular communication apparatus from the collected pieces of information on the moving object, and a moving-object frequence-degree change device that changes a degree of frequence of communication with the vehicular communication apparatus in accordance with at least one of the emergency level included in the received pieces of information and the determined emergency level, and that the moving-object processing change device change a method of processing the received pieces of information in accordance with the emergency level included in the received pieces of information and the determined emergency level. In this construction, the degree of frequence of communication between both the parties can also be changed in consideration of at least one of emergency levels of both the parties.

In a fourth aspect of the invention, a vehicular communication apparatus that is installed in a vehicle and that is designed to establish bidirectional communication with a foreign moving object comprises vehicular collection means for collecting a plurality of pieces of information on the vehicle obtained therefrom, vehicular selection means for selecting pieces of information to be transmitted to the foreign moving object from the collected pieces of information on the vehicle, and vehicular transmission means for transmitting only the selected pieces of information to the foreign moving object.

In the aforementioned fourth aspect, it is appropriate that the communication apparatus further comprise emergency level determination means for determining an emergency level of bidirectional communication with the foreign moving object on the basis of a relationship between the vehicle and the foreign moving object, wherein the selection means adds the emergency level determined by the emergency level determination means to the pieces of information to be transmitted.

In a fifth aspect of the invention, a vehicular communication apparatus that is installed in a vehicle and that is designed to establish bidirectional communication comprises vehicular transmission means for transmitting a certain piece of information including an identification code allowing the foreign moving object to identify the vehicle, vehicular reception means for receiving the piece of information including the identification code from the foreign moving object, vehicular detection means for detecting establishment of bidirectional communication between the vehicle and the foreign moving object on the basis of a result of identification of the identification code, vehicular collection means for collecting a plurality of pieces of information on the vehicle obtained therefrom, and vehicular selection means for selecting pieces of information to be transmitted to the foreign moving object from the collected pieces of information on the vehicle. If the vehicular detection means detects establishment of bidirectional communication, the vehicular transmission means transmits the pieces of information selected by the vehicular selection means to the foreign moving object.

In a sixth aspect of the invention, a communication apparatus installed in a moving object and that is designed to establish bidirectional communication with the vehicular communication apparatus according to the fourth aspect of the invention, to which the emergency level determination means has been further provided, comprises moving-object reception means, moving-object emergency level evaluation means, and moving-object processing change means. The moving-object reception means receives selected pieces of information transmitted from the vehicular transmission means of the vehicular communication apparatus. The moving-object emergency level evaluation means evaluates the emergency level included in the received pieces of information. The moving-object processing change means changes a method of processing the received pieces of information in accordance with the emergency level

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein:

FIGS. 4A and 4B show examples of own-vehicle information that can be stored as own-vehicle transmissible data during vehicle-to-vehicle communication;

FIGS. 5A to 5C show examples of methods of selecting own-vehicle information depending on various situations, and enumerate situational items of a high emergency level, situational items of an intermediate emergency level, and situational items of a low emergency level, respectively;

DETAILED DESCRIPTION OF PREFERRED EMBODIMENT

Figure 1:
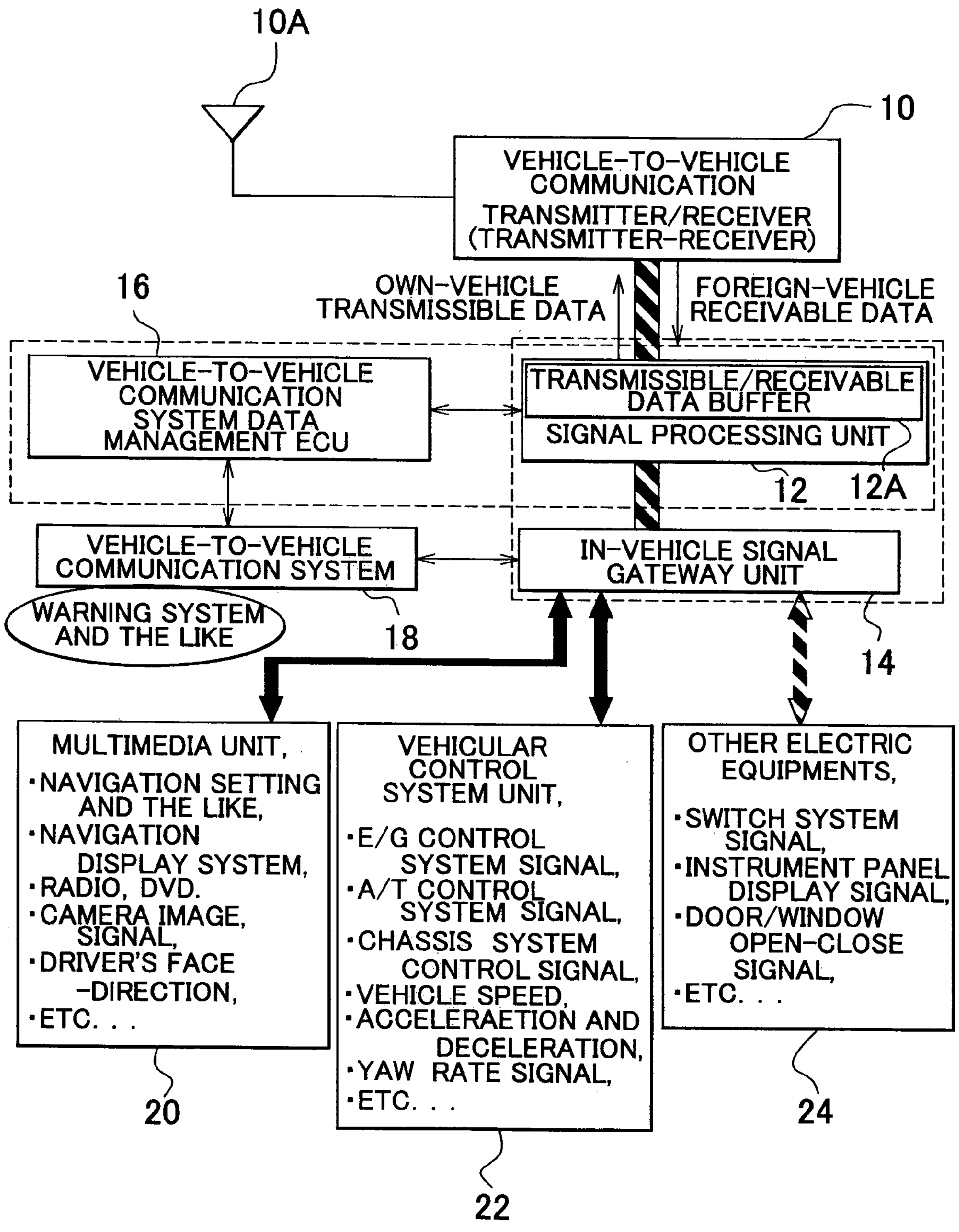
FIG. 1 is a block diagram of a vehicle-to-vehicle communication system in accordance with a first embodiment of the invention.

FIG. 1 is a block diagram of a vehicle-to-vehicle communication system in accordance with the first embodiment of the invention. A vehicle-to-vehicle communication transmitter/receiver 10 (hereinafter referred to simply as a "transmitter-receiver 10") is included in the vehicle-to-vehicle communication system of the first embodiment. The transmitter-receiver 10 is provided with an antenna 10A for vehicle-to-vehicle communication and establishes vehicle-to-vehicle communication with a foreign vehicle by transmitting or receiving radio waves of a radio-frequency bandwidth (e.g., millimeter waves of a bandwidth of 60 GHz). Spread spectrum communication may be adopted as a communication mode. In the description in "DETAILED DESCRIPTION OF PREFERRED EMBODIMENT" of the present specification, it is assumed, unless otherwise mentioned, that vehicles qualified for communication include a plurality of persons (e.g., pedestrians), bicycles, wheelchairs and the like as well as a plurality of vehicles (inclusive of two-wheel vehicles).

A signal processing unit 12 is connected to the transmitter-receiver 10 via a suitable bus such as a high-speed communication bus or the like. The signal processing unit 12 is provided with a transmissible/receivable data buffer 12A that temporarily stores data to be transmitted or received. The signal processing unit 12 stores foreign-vehicle information received by the transmitter-receiver 10 (hereinafter referred to as "foreign-vehicle receivable data") into the transmissible/receivable data buffer 12A, and delivers a signal generated on the basis of foreign-vehicle receivable data (hereinafter referred to as a "foreign-vehicle information signal") to later-described components including a gateway unit 14 and a data management ECU 16 (these processings will be described later in detail).

The gateway unit 14 is connected to the signal processing unit 12 via a suitable bus such as a high-speed communication bus or the like. The gateway unit 14 connects the signal processing unit 12 to various control units, various information systems, and the like of a vehicle. A multimedia unit 20 including a navigation system, an audio equipment, a camera, a cellular phone and the like, a control unit 22 including various control devices, various sensors and the like installed in the vehicle, and various electric equipments 24 installed in the vehicle are connected to the gateway unit 14 via suitable buses such as high-speed communication buses or the like. Accordingly, as shown in FIG. 1, great varieties of signals (hereinafter referred to as "own-vehicle information signals"), namely, state signals indicating various states of information systems such as the navigation system and the like, image signals, control signals output from the control devices, detection signals output from the sensors, on-off signals for various switches, and the like are input to the gateway unit 14.

In the first embodiment, various pieces of information that are either illustrated in the drawings or mentioned above are included in own-vehicle information signals. The invention is not intended to specifically limit the kinds of information included in own-vehicle information signals input to the gateway unit 14. That is, all pieces of information (see FIGS. 4A and 4B) that can be useful to a foreign vehicle or an own vehicle in vehicle-to-vehicle communication may be included in the own-vehicle information signals. From the standpoint of broadening the usefulness of vehicle-to-vehicle communication, it would be more desirable that as many varieties of information as possible be included in the own-vehicle information signals input to the gateway unit 14. The own-vehicle information signals input to the gateway unit 14 may include pieces of information obtained on the basis of various signals, for example, a friction coefficient between a road surface and wheels which is estimated on the basis of values detected by an acceleration sensor and wheel speed sensors.

The own-vehicle information signals input to the gateway unit 14 are delivered to the signal processing unit 12. The signal processing unit 12 stores various pieces of own-vehicle information included in the own-vehicle information signals into the transmissible/receivable data buffer 12A, and delivers own-vehicle information data (hereinafter referred to as "own-vehicle transmissible data") generated on the basis of the pieces of own-vehicle information to the transmitter-receiver 10 and the like (these processings will be described later in detail). The various pieces of own-vehicle information stored in the transmissible/receivable data buffer 12A are updated every time signals are input from the gateway unit 14.

The data management ECU 16 (an electronic control unit for data management) is connected to the signal processing unit 12. The data management ECU 16 is constructed as a microcomputer that is composed of a CPU, a ROM, a RAM and the like, which are interconnected via a bus (not shown). Various programs executed by the CPU are stored in the ROM.

The signal processing unit 12 is controlled by the data management ECU 16. That is, in accordance with a command from the data management ECU 16, the signal processing unit 12 generates foreign-vehicle information signals to be delivered to the gateway unit 14 on the basis of foreign-vehicle receivable data stored in the transmissible/receivable data buffer 12A, and generates own-vehicle transmissible data to be delivered to the transmitter-receiver 10 on the basis of the own-vehicle information stored in the transmissible/receivable data buffer 12A. The own-vehicle transmissible data are transmitted via the antenna 10A of the transmitter-receiver 10. The data management ECU 16 also controls a cycle on which the own-vehicle transmissible data are transmitted to the transmitter-receiver 10 (i.e., a transmission cycle of the transmitter-receiver 10).

Various vehicle-to-vehicle communication utilization systems 18 utilizing foreign-vehicle information and own-vehicle information obtained from vehicle-to-vehicle communication are connected to the data management ECU 16. The vehicle-to-vehicle communication utilization systems 18 include a warning system, a vehicle control system, a vehicle trail control system, and the like. The warning system issues a warning on the basis of a distance from a preceding vehicle, a speed of a preceding vehicle, or the like. The vehicle control system controls the vehicle on the basis of a relationship with a foreign vehicle (e.g., a relative speed) in such a manner as to avoid a collision with the foreign vehicle. The vehicle trail control system controls the vehicle such that the vehicle trails a preceding vehicle. The vehicle-to-vehicle communication utilization systems 18 can realize high-reliability control by effectively utilizing foreign-vehicle information obtained from vehicle-to-vehicle communication. For instance, in a system performing a control operation on the basis of a detected value of a speed of a running vehicle, the control operation can be performed with high precision by combining a speed of a preceding vehicle based on a result detected by a millimeter wave radar with a speed of the preceding vehicle obtained from vehicle-to-vehicle communication. In the case where a certain millimeter wave radar is employed in the own vehicle, information on a vehicle running in front of a preceding vehicle that cannot be detected easily can be acquired and utilized in various control operations.

The vehicle-to-vehicle communication utilization systems 18 are connected to the gateway unit 14. The vehicle-to-vehicle communication utilization systems 18 may determine an emergency level (a degree of necessity) of vehicle-to-vehicle communication with a specific foreign vehicle, on the basis of the own-vehicle and foreign-vehicle information stored in the transmissible/receivable data buffer 12A, information obtained from road-to-vehicle communication, and the like. In this case, the determined emergency level is stored into the transmissible/receivable data buffer 12A via the gateway unit 14. An emergency level is estimated from the standpoint of the risk of a scrape, a collision or the like and user-friendliness (details will be described later).

Figure 2:
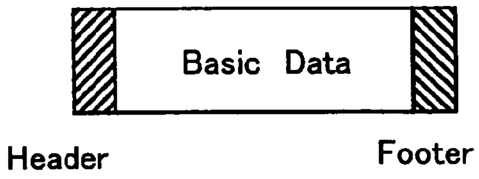
FIG. 2 shows an example of own-vehicle transmissible data that are generated before a foreign vehicle qualified for vehicle-to-vehicle communication is determined.

Referring now to FIGS. 2 to 4A and 4B, the own-vehicle transmissible data generated by the signal processing unit 12 will be described. In the first embodiment, the signal processing unit 12 generates own-vehicle transmissible data that differ depending on whether a foreign vehicle qualified for vehicle-to-vehicle communication has been determined or not. FIG. 2 shows an example of own-vehicle transmissible data that are generated before a foreign vehicle qualified for vehicle-to-vehicle communication is determined (i.e., own-vehicle transmissible data before the start of vehicle-to-vehicle communication, which will hereinafter be referred to as "pre-transmissible data" so as to be distinguished from own-vehicle transmissible data during vehicle-to-vehicle communication).

As shown in FIG. 2, the structure of pre-transmissible data includes a basic data portion, a head portion preceding the basic data portion, and a footer portion following the basic data portion. The header portion includes various pieces of required information (e.g., information on alteration of a transmission cycle) as well as information indicating the contents of the basic data portion, and indicates a start position of the basic data portion.

The basic data portion includes an ID code as indispensable information. The ID code is a proper code assigned to each vehicle and may be an IP address for example. An ID code in the case of a person, a bicycle or the like is a proper code assigned to a portable machine possessed by the person (including someone on a bicycle or the like) or to a portable machine attached to a bicycle or the like. This proper code is only required to be recognizable on the reception side.

The basic data portion preferably includes vehicle position information and vehicle type information. Vehicle position information indicates a current position of the own vehicle, and may be own-vehicle position information (included in the own-vehicle information signals input to the gateway unit 14) calculated on the basis of a GPS signal received by a GPS receiver (not shown). Position information in the case of a person, a bicycle or the like may not be included in the basic data portion. However, if the person, the bicycle or the like is equipped with a GPS receiver (e.g., if the person possesses a cellular phone in which a GPS receiver is built), position information can be included in the basic data portion. Vehicle type information is a code that allows the reception side to determine a type of the own vehicle. In the case of a four-wheel vehicle, for example, vehicle type information may be a vehicle type number on a license plate. In the case of a two-wheel vehicle, for example, vehicle type information may be specific alphanumeric characters assigned to each cylinder volume. In the case of a person, a bicycle or the like as well, vehicle type information may be specific alphanumeric characters.

The pre-transmissible data may be repeatedly transmitted on a constant transmission cycle. Preferably, the pre-transmissible data are determined in accordance with an update cycle (e.g., one second) of own-vehicle position information obtained from the GPS receiver. However, in the case where the latest position information on the own vehicle can be estimated, updated, and repeatedly retransmitted by a vehicle speed sensor, a yaw rate sensor, an acceleration sensor or the like between one update cycle and a subsequent update cycle, the pre-transmissible data may be retransmitted every time the latest position information on the own vehicle is updated. In particular, under a circumstance where the GPS receiver cannot receive a GPS signal (e.g., where the vehicle runs through a tunnel), it is useful to update and retransmit the latest position information on the own vehicle.

The pre-transmissible data thus transmitted constantly are received by a foreign vehicle that exists within a predetermined region. In this case, if the foreign vehicle has a system corresponding to the vehicle-to-vehicle communication system of the first embodiment, similar pre-transmissible data transmitted from the foreign vehicle are received by the own vehicle. The own vehicle and the foreign vehicle recognize the ID code included in the pre-transmissible data received by each other, whereby vehicle-to-vehicle communication between them is established and started. Alternatively, it is appropriate to transmit a request signal requesting vehicle-to-vehicle communication to the foreign vehicle after having recognized the ID code from the pre-transmissible data transmitted from the foreign vehicle. In this case, if an affirmative response signal is received from the foreign vehicle, vehicle-to-vehicle communication with the foreign vehicle is established and started.

Figure 3:
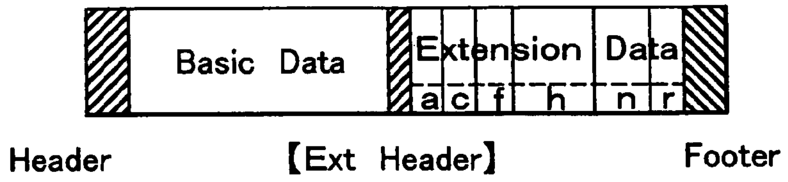
FIG. 3 shows an example of own-vehicle transmissible data that are generated during vehicle-to-vehicle communication.

FIG. 3 shows an example of own-vehicle transmissible data that are generated after a foreign vehicle qualified for vehicle-to-vehicle communication has been determined (i.e., own-vehicle transmissible data during vehicle-to-vehicle communication). After a foreign vehicle qualified for vehicle-to-vehicle communication has been determined, it is appropriate to transmit only the later-described own-vehicle transmissible data during vehicle-to-vehicle communication to the foreign vehicle qualified for vehicle-to-vehicle communication, without transmitting the aforementioned pre-transmissible data. Alternatively, it is also appropriate to transmit the own-vehicle transmissible data during vehicle-to-vehicle communication to the foreign vehicle qualified for vehicle-to-vehicle communication, while still transmitting the pre-transmissible data constantly.

As shown in FIG. 3, the own-vehicle transmissible data during vehicle-to-vehicle communication have a structure wherein an extension header portion preceding an extension data portion is added to the aforementioned pre-transmissible data. The extension header portion includes information indicating the contents of the extension data portion, and indicates a start position of the extension data portion.

The extension data portion includes, as indispensable information, an ID code of a vehicle qualified for vehicle-to-vehicle communication. Pieces of the own-vehicle information updated and stored in the transmissible/receivable data buffer 12A are selectively incorporated into the extension data portion. Accordingly, the own-vehicle transmissible data are so structured as to be variable in length.

FIGS. 4A and 4B show exemplary lists of pieces of own-vehicle information that can be stored in the structure of the own-vehicle transmissible data during vehicle-to-vehicle communication. The contents of the own-vehicle information shown in FIGS. 4A and 4B will not be described in detail. However, as own-vehicle information, items starting from a label "b", namely, many different pieces of information such as a state of a driver's operation (labels "c" to "e", "h", "i" and the like), a running state of the own vehicle (labels "f" and "g" and the like), things requested of a vehicle qualified for vehicle-to-vehicle communication (labels "p" to "t" and the like), messages to be conveyed to a vehicle qualified for vehicle-to-vehicle communication (labels "u" to "w" and the like), and simple messages (labels "ap" to "ay" and the like) are selectively incorporated into the extension data portion. As own-vehicle information, an emergency level (the label "b") is also selectively incorporated into the extension data portion.

The own-vehicle transmissible data during vehicle-to-vehicle communication may be repeatedly transmitted on a constant transmission cycle. If a foreign vehicle requiring vehicle-to-vehicle communication requests a certain transmission cycle, this transmission cycle is adopted. In establishing vehicle-to-vehicle communication with a plurality of vehicles, a cycle requested by the vehicle having the highest priority is taken into account by priority. However, the shortest possible transmission cycle may also be set depending on the capacity of the transmitter-receiver 10 of the own vehicle. If a change in priority occurs during vehicle-to-vehicle communication, the transmission cycle may be changed to a cycle requested by the vehicle having the highest priority. The priority may be determined in accordance with the aforementioned emergency level (at least one of an emergency level included in the own-vehicle transmissible data of the own vehicle and an emergency level included in foreign-vehicle receivable data transmitted from a foreign vehicle). Alternatively, the priority may also be determined in accordance with an ID code (or vehicle type information) included in the aforementioned basic data portion. For instance, the priority is set high in the case of an emergency vehicle (an ambulance or the like).

It may be determined whether or not vehicle-to-vehicle communication can be terminated, in accordance with the aforementioned emergency level (at least one of an emergency level included in the own-vehicle transmissible data of the own vehicle and an emergency level included in foreign-vehicle receivable data transmitted from a foreign vehicle). In establishing vehicle-to-vehicle communication with a plurality of vehicles, vehicle-to-vehicle communication with those having high emergency levels is established by priority. However, the number of vehicles participating in vehicle-to-vehicle communication may be limited depending on the capacity of the transmitter-receiver 10 of the own vehicle or the like. Accordingly, if a change in emergency level occurs during vehicle-to-vehicle communication with a plurality of vehicles, vehicle-to-vehicle communication with those having low emergency levels can be terminated or suspended.

As described above, the signal processing unit 12 prepares the own-vehicle transmissible data, namely, selects pieces of the own-vehicle information (and arranges the selected pieces of the own-vehicle information) in accordance with a command from the data management ECU 16. More specifically, the data management ECU 16 instructs the signal processing unit 12 on a method of preparing own-vehicle transmissible data in accordance with various situations (scenes) between vehicles participating in vehicle-to-vehicle communication. For example, if it is determined because of a very high emergency level that the risk of a scrape or a collision needs to be avoided, pieces of information with the labels "r" to "y" shown in FIG. 4 have priority over the other pieces of information when being selected. This method of selection will be described later in detail with reference to FIGS. 5A to 5C.

As another method of selection, the data management ECU 16 issues an instruction on a method of selecting own-vehicle information, in accordance with the contents of required things included in foreign-vehicle receivable data transmitted from a foreign vehicle. Alternatively, the data management ECU 16 may issue an instruction on a method of selecting own-vehicle information, in accordance with a request made by the vehicle-to-vehicle communication utilization systems 18 (see FIG. 1). For instance, if a warning system makes a request for information on speed of a foreign vehicle, the data management ECU 16 outputs to the signal processing unit 12 an instruction to incorporate required items of speed information (the labels "p" to "t" and the like) as well as an ID code of the foreign vehicle (the label "a" in FIG. 4A) into the extension data portion.

The data management ECU 16 may also issue an instruction on a method of selecting own-vehicle information, in accordance with vehicle type information (included in the aforementioned pre-transmissible data) on a vehicle qualified for vehicle-to-vehicle communication. This is based on the reason that since incommunicable or undetectable pieces of information exist in a certain vehicle qualified for vehicle-to-vehicle communication, those pieces of information should be prevented from being requested in vain. For instance, this is based on the reason that if the vehicle qualified for vehicle-to-vehicle communication is a person or the like, a speed at which the person walks (corresponding to the label "f" in FIG. 4A) is neither detectable nor communicable.

By the same token, the data management ECU 16 may also issue an instruction on a method of selecting own-vehicle information, in accordance with information on a vehicle-to-vehicle communication system installed in a vehicle qualified for vehicle-to-vehicle communication (e.g., version information or transmittable/receivable contents of information (which may be defined in the extension header portion or the like)). This is based on the reason that since incommunicable or undetectable pieces of information exist if a vehicle-to-vehicle communication system installed in a vehicle qualified for vehicle-to-vehicle communication functions in a certain manner, those pieces of information should be prevented from being requested in vain.

These methods of selecting own-vehicle information (and methods of arranging pieces of information included in the extension data portion) may be changed in accordance with various situational changes or structural changes in the own-vehicle transmissible data, every time another transmission cycle begins.

As described above, the vehicle-to-vehicle communication system of the first embodiment can realize efficient vehicle-to-vehicle communication by transmitting pre-transmissible data including the minimum required pieces of information for establishing vehicle-to-vehicle communication before vehicle-to-vehicle communication is established, and by transmitting own-vehicle transmissible data in which required pieces of information are selectively incorporated while vehicle-to-vehicle communication is established. Thus, even under a circumstance where many vehicles crowd around one another, signals indicating bulky information are not transmitted or received among the vehicles, and the burden in processing received signals is alleviated. Also, the frequency bandwidth assigned to vehicle-to-vehicle communication can be utilized efficiently.

Vehicles participate in vehicle-to-vehicle communication after having recognized each other's ID code. Therefore, even under a circumstance where many vehicles crowd around one another, it can never become impossible to identify a vehicle to which obtained pieces of information pertain. As a result, the reliability of vehicle-to-vehicle communication can be enhanced. By allowing pedestrians, bicycles and the like as well as standard vehicles to participate in vehicle-to-vehicle communication, the usefulness of vehicle-to-vehicle communication can further be enhanced. In this case as well, since a vehicle and a pedestrian, a bicycle or the like recognize each other's ID code, vehicle-to-vehicle communication can be realized with high reliability.

In addition, as described above, only pieces of information selected from many collected pieces of information are transmitted during vehicle-to-vehicle communication, so that vehicle-to-vehicle communication can be realized with high efficiency without narrowing the range of pieces of information that can be communicated through vehicle-to-vehicle communication. Accordingly, vehicles can exchange only useful pieces of information with one another. Consequently, the usefulness of vehicle-to-vehicle communication is enhanced.

Methods of selecting own-vehicle information corresponding to respective situations will now be described in detail with reference to FIGS. 5A to 5C (and FIGS. 4A and 4B). FIGS. 5A to 5C show examples of selected pieces of own-vehicle information corresponding to respective situational items. The labels "a" to "az" in FIGS. 5A to 5C respectively correspond to the pieces of own-vehicle information shown in FIGS. 4A and 4B. As for symbols attached to the labels, each double circle, each circle, and each triangle represent an item requiring transmission, an item to be selected in case of necessity, and a hardly selected but selectable item, respectively.

For example, in the case of a head-on collision according to a situational item (1) aiming at preventing accidents, an ID code (the label "a") of a vehicle qualified for vehicle-to-vehicle communication is indispensably selected, and pieces of information accompanied by double circles in FIG. 5A (i.e., pieces of information accompanied by the labels "c" to "f", "q", "aa", and "ah" in FIGS. 4A and 4B) are selected. In addition, since the purpose of vehicle-to-vehicle communication belongs to a category of prevention of accidents, "A" (the label "b") is selected on the ground that the emergency level is high, and pieces of information accompanied by circles in FIG. 5A (i.e., pieces of information accompanied by the labels "g", "h" and the like in FIG. 4A) are selected in case of necessity. In some cases (e.g., if usefulness is acknowledged), pieces of information accompanied by triangles in FIG. 5A (e.g., pieces of information accompanied by the labels "i" and "j" and the like in FIG. 4A) are selected. An ID code (the label "a") of a vehicle qualified for vehicle-to-vehicle communication may be a code obtained from pre-transmissible data received from the vehicle.

As shown in FIG. 5B, in the case of conveyance of a forward traffic situation according to a situational item (8) aiming at assisting driving (prevention and safety) (e.g., if a vehicle running behind requests conveyance of a forward traffic situation), an ID code (the label "a") of a vehicle qualified for vehicle-to-vehicle communication is indispensably selected, and a piece of information on an infrastructure on a road stretching ahead (the label "az") is selected. In addition, since the purpose of vehicle-to-vehicle communication belongs to a category of assistance in driving, "B" (the label "b") is selected on the ground that the emergency level is intermediate. If necessary, a detected situation as to obstacles lying ahead (the label "n") and a message (the label "q") concerning the capacity to respond (to a request made by a vehicle participating in communication) are selected.

By the same token, in the case of a request for information gathering according to a situational item (16) aiming at information interchange (communication), an ID code (the label "a") of a vehicle qualified for vehicle-to-vehicle communication is indispensably selected, and pieces of information accompanied by double circles in FIG. 5C (i.e., pieces of information accompanied by the labels "ai", "an" and "az" in FIG. 4B) are selected. Moreover, since the purpose of vehicle-to-vehicle communication belongs to a category of information interchange (communication), "C" (the label "b") is selected on the ground that the emergency level is low. If necessary, pieces of information accompanied by circles in FIG. 5C (i.e., pieces of information accompanied by the labels "p" and "ao" in FIGS. 4A and 4B) are selected. In the required items accompanied by the labels "ai" to "an", pieces of information fetched from a vehicle qualified for vehicle-to-vehicle communication are encoded. In this case, requests made by the aforementioned vehicle-to-vehicle communication utilization systems 18 may be taken into account.

A relationship in correspondence between various situational items and selected items as shown in FIGS. 5A to 5C is stored in advance as a map in a predetermined memory (e.g., the ROM of the data management ECU 16). The situations as shown in FIGS. 5A to 5C are recognized on the basis of information sent from the aforementioned vehicle-to-vehicle communication utilization systems 18, own-vehicle and foreign-vehicle information stored in the transmissible/receivable data buffer 12A, information obtained through road-to-vehicle communication, and the like. Own-vehicle transmissible data corresponding to each of the recognized situations are generated using a map as shown in FIGS. 5A to 5C or the like.

For instance, if it is determined on the basis of information obtained from a CCD camera, the navigation system or the like that there is an obstacle in a lane where the own vehicle runs, the situational item (1) in FIG. 5A is regarded as relevant, and own-vehicle transmissible data consisting of selected items corresponding to the situational item (1) are prepared and transmitted. For instance, if a change in running direction (a right turn or a left turn) of the own vehicle is detected on the basis of an operational state of a winker or information obtained from the navigation system or the like, a situational item (2) in FIG. 5A is regarded as relevant, and own-vehicle transmissible data consisting of selected items corresponding to the situational item (2) are prepared and transmitted.

For instance, if it is determined on the basis of information obtained from the millimeter wave radar, the CCD camera or the like (a distance between the own vehicle and a preceding vehicle, or a relative speed of the vehicles, or the like) that there is a risk of colliding with the preceding vehicle, a situational item (3) in FIG. 5A is regarded as relevant, and own-vehicle transmissible data consisting of selected items corresponding to the situational item (3) are prepared and transmitted. For instance, if it is determined on the basis of information obtained from the CCD camera, the navigation system or the like that the own vehicle has entered an intersection equipped with "stop lines but no traffic lights", a situational item (4) in FIG. 5A is regarded as relevant, and own-vehicle transmissible data consisting of selected items corresponding to the situational item (4) are prepared and transmitted.

As for the aforementioned emergency level, for example, if vehicle trail control is being performed, the emergency level of vehicle-to-vehicle communication with a preceding vehicle may be set high with a view to further enhancing the reliability of vehicle trail control. If warning control for controlling a timing for issuing a warning on the basis of a distance from a preceding vehicle which is measured by the millimeter wave radar, the CCD camera or the like is being performed, the emergency level of vehicle-to-vehicle communication with the preceding vehicle may be set high with a view to making a timing for issuing a warning more appropriate and enhancing safety. In a vehicle wherein the risk of a collision with a foreign vehicle is predicted on the basis of a detection signal of the millimeter wave radar or the like and wherein collision prediction control for performing a control operation to avoid the collision is performed if the collision is predicted, it is appropriate that the emergency level of vehicle-to-vehicle communication with a foreign vehicle qualified for prediction be set high as soon as the foreign vehicle is specified by the millimeter wave radar or the like, and that the emergency level be gradually increased as the risk of a predicted collision rises.

If a foreign vehicle exists in a lane of the own vehicle or exists within a predetermined range around the own vehicle, the emergency level of vehicle-to-vehicle communication with the foreign vehicle may be set high. If a foreign vehicle is on the verge of cutting into a lane of the own vehicle or crossing a road stretching ahead of the own vehicle (e.g., if the foreign vehicle is on the verge of making a right turn at an intersection that is being approached by the own vehicle), the emergency level of vehicle-to-vehicle communication with the foreign vehicle may be set high.

It is not absolutely required that an emergency level be determined by the vehicle-to-vehicle communication utilization systems 18 as described above. Instead, the data management ECU 16 may directly determine an emergency level on the basis of information obtained from the aforementioned vehicle-to-vehicle communication utilization systems 18 (e.g., various control signals relating to vehicle trail control (radar cruise), collision prediction control and the like), own-vehicle and foreign-vehicle information stored in the transmissible/receivable data buffer 12A (e.g., detection signals of various sensors such as the millimeter wave radar, an accelerator pedal ON/OFF sensor and the like), information obtained through road-to-vehicle communication, or the like.

As described above, according to the first embodiment, only those which are selected from a great number of collected pieces of information in accordance with various situations (scenes) are transmitted to a vehicle qualified for communication. Therefore, vehicle-to-vehicle communication can be realized with high efficiency without narrowing the range of information that can be exchanged through vehicle-to-vehicle communication. Further, an emergency level of vehicle-to-vehicle communication is conveyed to each vehicle qualified for communication. Thus, even under a circumstance where many vehicles crowd around one another, those requiring vehicle-to-vehicle communication are ensured of communication. As a result, the usefulness of vehicle-to-vehicle communication is enhanced.

It is to be noted herein that there are wide varieties of relationships in correspondence between situational items and selected items and wide varieties of methods of setting an emergency level, and that the invention should not be limited to the foregoing description.

Figure 6:
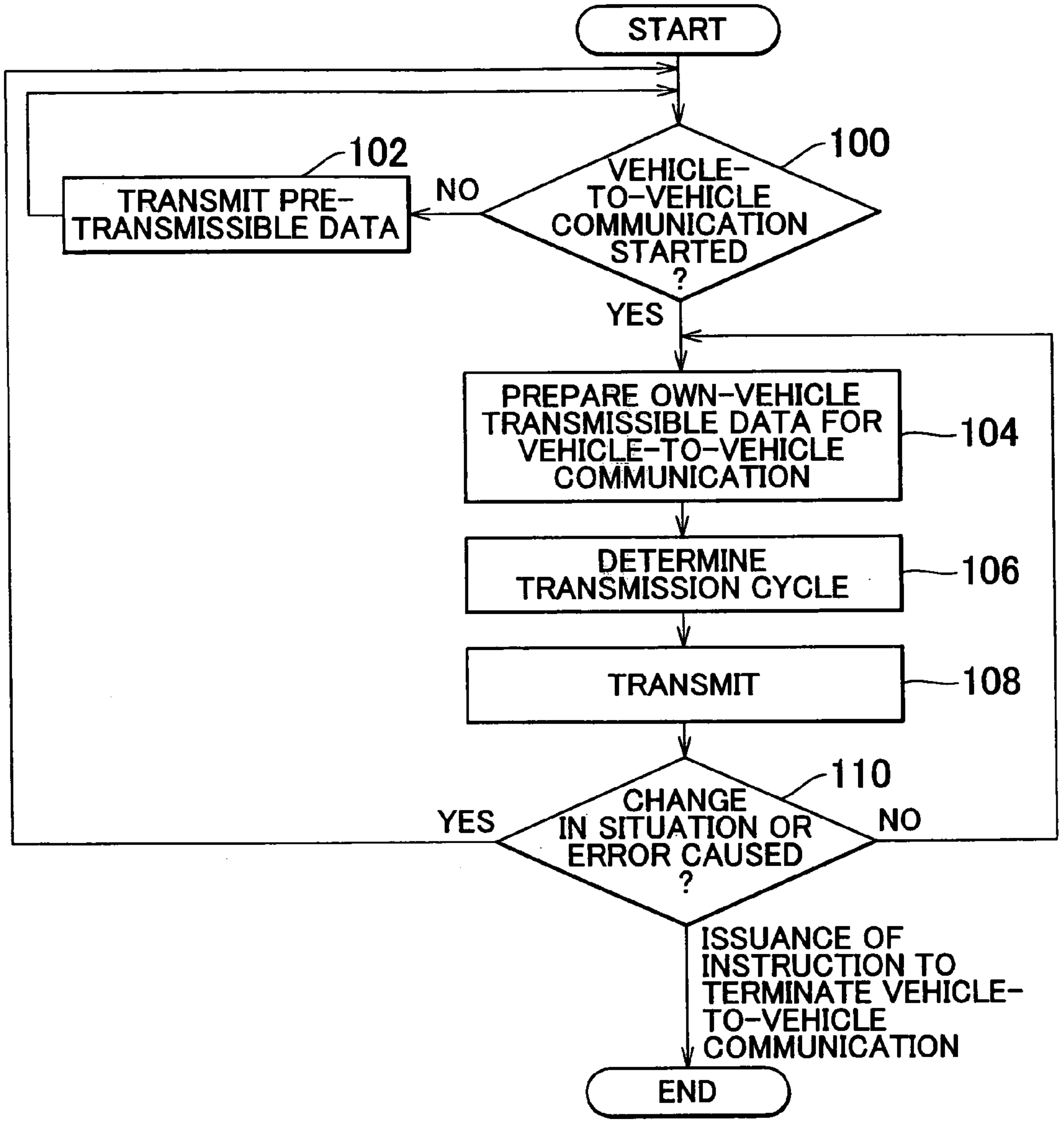
FIG. 6 is a flowchart of processings for realizing a transmitting portion of vehicle-to-vehicle communication in accordance with the invention.

Referring now to FIG. 6, the contents of processings that are performed by the vehicle-to-vehicle communication system of the first embodiment at the time of transmission will be described. FIG. 6 is a flowchart of processings for realizing a transmitting portion of the aforementioned useful vehicle-to-vehicle communication. The aforementioned various pieces of own-vehicle information (see FIGS. 4A and 4B) are stored and updated in the transmissible/receivable data buffer 12A.

If the vehicle-to-vehicle communication system is activated, it is first determined in a step 100 whether or not vehicle-to-vehicle communication has been started. If it is determined that vehicle-to-vehicle communication has not been started, the control operation proceeds to a step 102. In the step 102, the aforementioned pre-transmissible data are then transmitted regularly until vehicle-to-vehicle communication is started. A cycle of this regular transmission is defined in the header portion of the pre-transmissible data.

If vehicle-to-vehicle communication is started, the control operation proceeds to a step 104. In the step 104, a processing of preparing own-vehicle transmissible data during the aforementioned vehicle-to-vehicle communication is performed. More specifically, as described above, required pieces of own-vehicle information are selected from various pieces of own-vehicle information that are stored and updated in the transmissible/receivable data buffer 12A, in accordance with various situations, requests made by foreign vehicles, or the like. Then, the selected pieces of own-vehicle information are arranged and stored into the extension data portion following the basic data portion. At this moment, the contents of own-vehicle information stored in the basic data portion are defined in the extension header portion.

If the processing in the step 104 is terminated, the control operation proceeds to a step 106. In the step 106, a transmission cycle of the own-vehicle transmissible data is determined as described above in accordance with a transmission cycle of a vehicle qualified for vehicle-to-vehicle communication. In this case, if the transmission cycle thus transmitted is different from the transmission cycle of the aforementioned pre-transmissible data (or a transmission cycle of the last own-vehicle transmissible data), the contents of a change in transmission cycle are defined in the extension header portion.

If the processing in the step 106 is terminated, the control operation proceeds to a step 108. In the step 108, the prepared own-vehicle transmissible data are delivered to the transmitter-receiver 10 and transmitted to a vehicle qualified for vehicle-to-vehicle communication. The aforementioned processings of the steps 104 to 108 are repeated, for example, unless a user or the like issues an order to forcibly terminate them or unless a circumstantial change occurs (in a step 110). If the user or the like issues an order to forcibly terminate those processings, they are terminated. If a circumstantial change or the like occurs, the control operation returns to the step 100 and the subsequent processings are performed. When data are stored into the transmissible/receivable data buffer 12A (at intervals of a few cycles), it may be checked whether or not there is a buffer error such as overflow or garbled data. In this case, if a buffer error has occurred, the transmissible/receivable data buffer 12A is reset. However, if the transmissible/receivable data buffer 12A does not recover to its normal operational state even after having been reset a certain number of times or more, a warning is issued to terminate the aforementioned processings.

Figure 7:
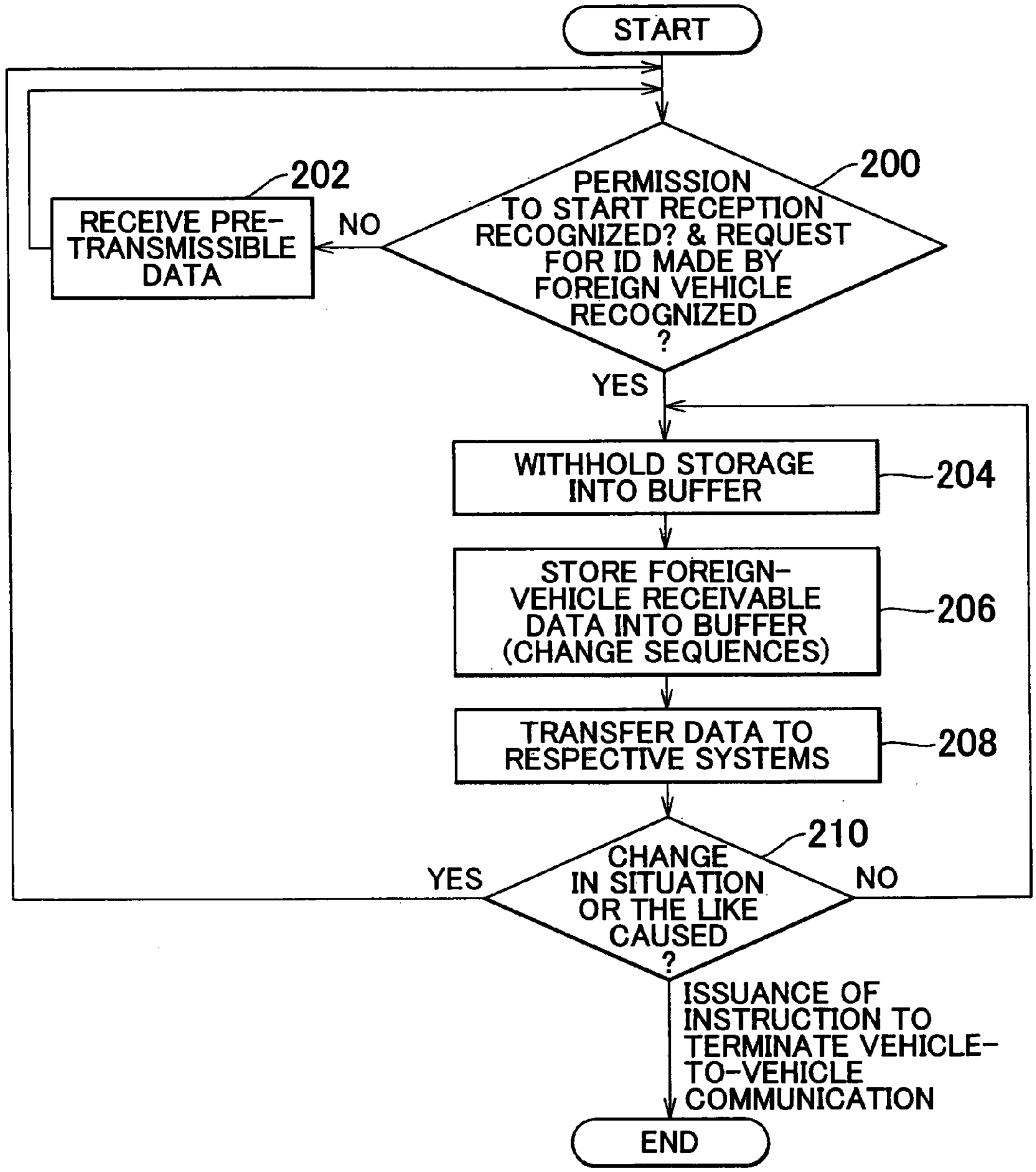
FIG. 7 is a flowchart of processings for realizing a receiving portion of vehicle-to-vehicle communication in accordance with the invention.

Referring now to FIG. 7, the contents of processings that are performed by the vehicle-to-vehicle communication system of the first embodiment will be described. FIG. 7 is a flowchart of processings for realizing a receiving portion of the aforementioned useful vehicle-to-vehicle communication.

If the vehicle-to-vehicle communication system is activated, it is first determined in a step 200 whether or not the own vehicle is ready to start vehicle-to-vehicle communication and whether or not a request for the ID code of the own vehicle (or a request for vehicle-to-vehicle communication in which the ID code of the own vehicle is specified) has been made. It may be determined whether or not vehicle-to-vehicle communication can be started, by checking operation of the transmissible/receivable data buffer 12A (e.g., by checking the contents written into the transmissible/receivable data buffer 12A). If any one of the aforementioned determinations turns out to be negative in the step 200, the control operation proceeds to a step 202. In the step 202, an instruction to regularly receive pre-transmissible data from a foreign vehicle is given until both the aforementioned determinations turn out to be affirmative.

On the other hand, if a state of being able to start reception is established, vehicle-to-vehicle communication is started, and the control operation proceeds to a step 204. In the step 204, an instruction to withhold storage into the transmissible/receivable data buffer 12A is issued. The control operation then proceeds to a step 206. In the step 206, a processing of storing foreign-vehicle receivable data received from a foreign vehicle into the transmissible/receivable data buffer 12A is performed. The foreign-vehicle receivable data correspond to the aforementioned own-vehicle transmissible data transmitted by the own vehicle. In the step 206, pieces of information in the extension data portion of the foreign-vehicle receivable data are suitably arranged and stored into the transmissible/receivable data buffer 12A on the basis of information in (the contents of) the extension header portion. At this moment, pieces of foreign-vehicle information in the extension data portion of the foreign-vehicle receivable data may be decomposed in accordance with various situations, an emergency level (at least one of an emergency level of the own vehicle and an emergency level included in the foreign-vehicle receivable data), or the like. For instance, in the case of a high emergency level, the pieces of information in the foreign-vehicle receivable data are decomposed into short sequences with a view to accelerating conveyance of foreign-vehicle information of the high emergency level. In the case of a low emergency level, the pieces of foreign-vehicle information are stored as long sequences. Further, own-vehicle transmissible data including things required by various systems 13 are transmitted. In the case of a high emergency level, it is appropriate that pieces of information corresponding to the required things be fetched from various pieces of foreign-vehicle information by priority and be stored into the transmissible/receivable data buffer 12A.

After the processing in the step 206 has been terminated, the control operation proceeds to a step 208. In the step 208, the foreign-vehicle receivable data stored in the transmissible/receivable data buffer 12A are transmitted to the gateway unit 14 as foreign-vehicle information signals and then are delivered to the systems 13 and the like via the gateway unit 14. The processings in the steps 204 to 208 are repeated, for example, unless the user or the like issues an order to forcibly terminate them or unless a circumstantial change occurs (in a step 210). If the user or the like issues an order to forcibly terminate those processings, they are terminated. If a circumstantial change, erroneous reception, or the like occurs, the control operation returns to the step 200 and the subsequent processings are performed. If erroneous reception has occurred, a request for retransmission is transmitted, the control operation returns to the step 200, and then the subsequent processings are performed.

In the aforementioned embodiment, "a plurality of pieces of information obtained from a vehicle" mentioned in the claims correspond to the pieces of own-vehicle information stored in the transmissible/receivable data buffer 12A (see FIGS. 1, 4A, and 4B).

Although the preferred embodiment of the invention has been described hitherto in detail, the invention is not limited thereto. The aforementioned embodiment can be modified or replaced in various manners without departing from the scope of the invention.

For instance, in the aforementioned embodiment, the functions of the signal processing unit 12 and the transmissible/receivable data buffer 12A may be entrusted to the gateway unit 14, the data management ECU 16, or the transmitter-receiver 10. The function of the data management ECU 16 may also be realized by another ECU (e.g., a vehicle trail control ECU).

In the aforementioned embodiment, the transmission cycle of the own-vehicle transmissible data may be changed in accordance with various situations, an emergency level (at least one of an emergency level of the own vehicle and an emergency level included in the foreign-vehicle receivable data), a type of an object qualified for communication, or the like, as in the case of arrangement of the own-vehicle transmissible data. Alternatively, the transmission cycle of the own-vehicle transmissible data may be changed in accordance with a change in structure of the own-vehicle transmissible data.

As described hitherto, according to the invention, pieces of information that are useful to both the transmission side and the reception side are selected and conveyed, whereby the burden in performing processings on the reception side is alleviated and the usefulness of bidirectional communication can be enhanced.

What is claimed is:

1. A vehicular communication apparatus that is installed in a vehicle and that is designed to establish bidirectional communication with a foreign moving object, in which a plurality of pieces of information are repeatedly transmitted and received in a constant cycle, comprising:

a collection device that collects the plurality of pieces of information on the vehicle;

a selection device that selects selected pieces of information to be transmitted to the foreign moving object from the collected pieces of information on the vehicle; and a transmission device that transmits only the selected pieces of information to the foreign moving object, wherein the selection device selects the selected pieces of information to be transmitted in accordance with an emergency level which is determined in accordance with a situation between the vehicle and the foreign moving object.

2. The vehicular communication apparatus according to claim 1, wherein the selection device selects the selected pieces of information to be transmitted in accordance with a type of the foreign moving object.

3. The vehicular communication apparatus according to claim 1, wherein the selection device selects the selected pieces of information to be transmitted in accordance with a request made by the foreign moving object.

4. The vehicular communication apparatus according to claim 1, wherein the selection device selects the selected pieces of information to be transmitted in accordance with a relationship between the vehicle and the foreign moving object.

5. The vehicular communication apparatus according to claim 1, wherein the selection device selects the selected pieces of information to be transmitted in accordance with a relationship between the vehicle and the foreign moving object and a circumstance in which the vehicle runs.

6. The vehicular communication apparatus according to claim 1, further comprising an emergency level determination device that determines an emergency level of bidirectional communication with the foreign moving object on the basis of a relationship between the vehicle and the foreign moving object, wherein the selection device adds the emergency level determined by the emergency level determination device to the selected pieces of information to be transmitted.

7. The vehicular communication apparatus according to claim 6, wherein the emergency level is determined in accordance with a possibility that concerns a collision or a scrape between the vehicle and the foreign moving object and that is predicted on the basis of the relationship between the vehicle and the foreign moving object.

8. The vehicular communication apparatus according to claim 6, further comprising a communication frequence-degree change device that changes a degree of frequence of communication with the foreign moving object in accordance with the determined emergency level.

9. The vehicular communication apparatus according to claim 6, further comprising a communication object determination device that determines, in accordance with the determined emergency level, a foreign moving object to establish communication with.

10. A communication apparatus installed in a moving object and that is designed to establish bidirectional communication with the vehicular communication apparatus according to claim 7, comprising:

a moving-object reception device that receives the selected pieces of information transmitted from the vehicular transmission device of the vehicular communication apparatus;

a moving-object emergency level evaluation device that evaluates the emergency level included in the received pieces of information; and a moving-object processing change device that changes a method of processing the received pieces of information in accordance with the emergency level.

11. The communication apparatus according to claim 10, wherein the emergency level is determined in accordance with a possibility that concerns a collision or a scrape between the vehicle and the foreign moving object and that is predicted on the basis of a relationship between the vehicle and the foreign moving object.

12. The communication according to claim 10, wherein the vehicular communication apparatus further comprises communication frequence-degree change device that changes a degree of frequence of communication with the foreign moving object in accordance with the determined emergency level.

13. The communication apparatus according to claim 10, further comprising a moving-object emergency level determination that determines an emergency level of bidirectional communication with the vehicular communication apparatus on the basis of a relationship between the moving object and the vehicle, wherein the moving-object processing change device changes a method of processing the received pieces of information in accordance with the determined emergency level and the emergency level included in the received pieces of information.

14. The communication apparatus according to claim 13, further comprising:

a moving-object collection device that collects a plurality of pieces of information on the moving object;

a moving-object selection device that selects selected pieces of information to be transmitted to the vehicular communication apparatus from the collected pieces of information on the moving object; and a moving-object frequence-degree change device that changes a degree of frequence of communication with the vehicular communication apparatus in accordance with at least one of the emergency level included in the received pieces of information and the determined emergency level.

15. The vehicular communication apparatus according to claim 1, wherein the selection device selects the selected pieces of information to be transmitted in accordance with a circumstance in which the vehicle runs.

16. A vehicular communication apparatus that is installed in a vehicle and that is designed to establish bidirectional communication with a foreign moving object, in which a plurality of pieces of information are repeatedly transmitted and received in a constant cycle, comprising:

a transmission device that transmits a certain piece of information including an identification code allowing the foreign moving object to identify the vehicle;

a reception device that receives the piece of information including the identification code from the foreign moving object;

a detection device that detects establishment of bidirectional communication between the vehicle and the foreign moving object on the basis of a result of identification of the identification code;

a collection device that collects the plurality of pieces of information on the vehicle obtained therefrom; and a selection device that selects selected pieces of information to be transmitted to the foreign moving object from the collected pieces of information on the vehicle, wherein the transmission device transmits the selected pieces of information selected by the selection device to the foreign moving object if the detection device detects establishment of bidirectional communication and wherein the selection device selects the selected pieces of information to be transmitted in accordance with an emergency level which is determined in accordance with a situation between the vehicle and the foreign moving object.

17. A vehicular communication apparatus that is installed in a vehicle and that is designed to establish bidirectional communication with a foreign moving object, in which a plurality of pieces of information are repeatedly transmitted and received in a constant cycle, comprising:

collection means for collecting the plurality of pieces of information on the vehicle;

selection means for selecting selected pieces of information to be transmitted to the foreign moving object from the collected pieces of information on the vehicle;

transmission means for transmitting only the selected pieces of information to the foreign moving object; and emergency level determination means for determining an emergency level of bidirectional communication with the foreign moving object on the basis of a situation between the vehicle and the foreign moving object.

18. The vehicular communication apparatus according to claim 17, wherein the selection means adds the emergency level determined by the emergency level determination means to the selected pieces of information to be transmitted.

19. A communication apparatus installed in a moving object and that is designed to establish bidirectional communication with the vehicular communication apparatus according to claim 18, comprising:

moving-object reception means for receiving the selected pieces of information transmitted from the vehicular transmission means of the vehicular communication apparatus;

moving-object emergency level evaluation means for evaluating the emergency level included in the received pieces of information; and moving-object processing change means for changing a method of processing the received pieces of information in accordance with the emergency level.

20. A vehicular communication apparatus that is installed in a vehicle and that is designed to establish bidirectional communication with a foreign moving object, in which a plurality of pieces of information are repeatedly transmitted and received in a constant cycle, comprising:

transmission means for transmitting a certain piece of information including an identification code allowing the foreign moving object to identify the vehicle;

reception means for receiving the piece of information including the identification code from the foreign moving object;

detection means for detecting establishment of bidirectional communication between the vehicle and the foreign moving object on the basis of a result of identification of the identification code;

collection means for collecting the plurality of pieces of information on the vehicle; and selection means for selecting selected pieces of information to be transmitted to the foreign moving object from the collected pieces of information on the vehicle, wherein the transmission means transmits the selected pieces of information selected by the selection means to the foreign moving object if the detection means detects establishment of bidirectional communication and wherein the selection means selects the selected pieces of information to be transmitted in accordance with an emergency level which is determined in accordance with a situation between the vehicle and the foreign moving object.

* * * * *